United States Patent

Lewis

[15] 3,642,227
[45] Feb. 15, 1972

[54] FILM DISPLAY DEVICE

[72] Inventor: John Henry Reginald Lewis, Theydon Bois, England

[73] Assignee: The Marconi Company Limited, London, England

[22] Filed: Sept. 11, 1969

[21] Appl. No.: 857,129

[30] Foreign Application Priority Data

Sept. 12, 1968  Great Britain.....................43,317/68

[52] U.S. Cl............................................242/193, 352/156
[51] Int. Cl......................................G03b 1/04, G11b 15/32
[58] Field of Search........................242/193, 198, 205–210,
242/76; 352/156–158

[56] References Cited

UNITED STATES PATENTS

| | | | |
|---|---|---|---|
| 1,428,480 | 9/1922 | Giroux | 242/210 |
| 1,708,087 | 4/1929 | Friess | 352/156 |
| 2,914,265 | 11/1959 | Vanderwal, Jr. | 242/190 |
| 3,015,453 | 1/1962 | Furman et al. | 242/198 |

Primary Examiner—Leonard D. Christian
Attorney—Baldwin, Wight & Brown

[57] ABSTRACT

A film display device of compact design having between the usual two storage spools, a gate through which the film is passed. The two spools are able to rotate on approximately parallel axes, and the film by means of specially positioned rollers is caused to twist so that the axes of the spools are approximately parallel with the line of movement of the film through the gate.

PATENTED FEB 15 1972 3,642,227
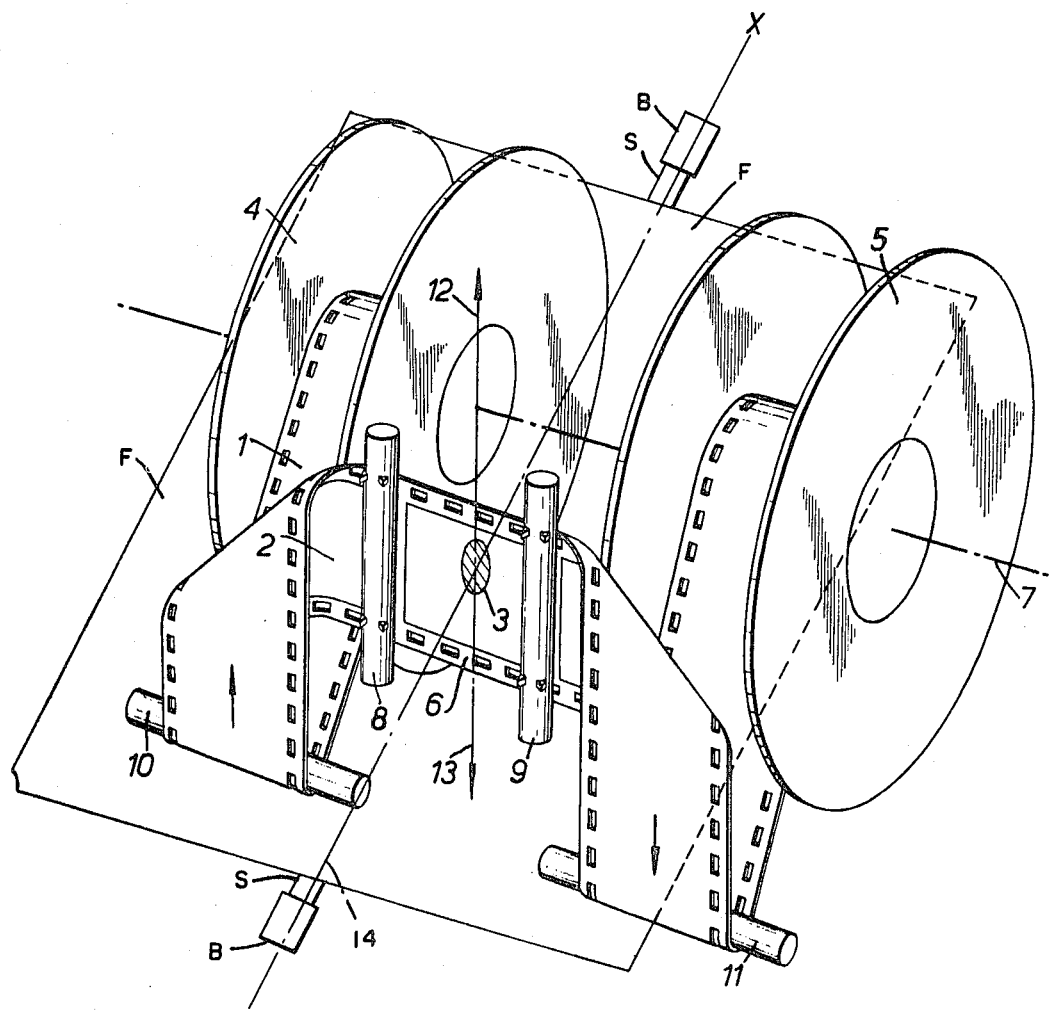
Inventor:
John Henry Reginald Lewis
By Baldwin Wight Killer & Brown
Attorneys

FILM DISPLAY DEVICE

This invention relates to display devices utilizing film and more particularly to airborne map display devices in which may details recorded on film are projected onto a screen to provide a continuously changeable map display of an area over which an aircraft carrying the device is flying. Usually the movement of the film is controlled by means responsive to positional signals derived from the aircraft navigational radar system.

In airborne equipment in particular it is most desirable that bulk and occupation of space be reduced to a minimum. Of practical necessity, the use of film requires the use of two storage spools from one to the other of which the film is driven. Hitherto the arrangement of the spools has followed conventional cinematograph practice with the spools in line with the film gate. Such an arrangement occupies an undesirable amount of space. In some cases so onerous are the requirements of compactness that it has been found necessary so to reduce the size of the spools that the length of film which may be accommodated on them is much less than is desirable. The problem is even greater where, as is often the case, the projection system including the storage spools is required to be rotatable about an axis passing through the center of the display to enable the orientation of the display to be changed from, for example, a so-called "head-up" to a so-called "north-up" display. As will be appreciated, the effective volume of space occupied by the rotatable parts is that swept by the parts during rotation.

The present invention has for its object the provision of improved film display devices which, while compact, will handle comparatively long lengths of film.

According to this invention a film display device comprises a film gate through which film for display is passed; two film storage spools for the film, the film being arranged to pass through the gate from one spool to the other and the rotational axis of each spool being parallel with or making an angle substantially less than a right angle with the line of movement of film through the gate; and means for guiding film between each spool and the film gate in such manner that the film therebetween includes a twisted portion between two relatively fixed points.

By mounting the film storage spools in such a way that their axes are parallel with or make an angle substantially less than a right angle with the line of movement of film through the gate, it becomes possible so to position the spools that they do not extend sideways of the gate to as great an extent as they do in known arrangements in which the axes are perpendicular to the line of movement of film through the gate.

Ideally the rotational axis of each spool should be parallel to the direction of film movement through the film gate but if the rotational axis of each spool makes any suitable angle to the direction of film travel through said film which is substantially less than 90°, for example 45°, some improvement will result. Preferably the spools are mounted on separate shafts having a common rotational axis.

Preferably again rollers are provided at each of the two relatively fixed points in the path between each spool and the film gate, the rotational axes of all of the rollers being relatively fixed with respect to each other and to the film gate.

Preferably the rotational axes of the two rollers in each path are at right angles to one another so as to restrain film therebetween to follow a path which is twisted in a natural curve through 180°.

Preferably again the rollers are arranged to be driven simultaneously and at the same speed so that the film between the rollers of each pair may take up a natural twist substantially free from tension.

In preferred embodiments of the present invention the film gate, together with the film guide means, is movable in a direction at right angles to the direction of film travel therethrough so as to enable different portions of the film to be displayed, and the whole assembly of film gate and film guide means is rotatable about an axis passing through the center of the display.

The invention is illustrated in and further described with reference to the accompanying drawing which shows, so far as is necessary for an understanding thereof, a map display unit in accordance with the present invention.

Referring to the drawing, a length of photograph film 1 is provided containing a plurality of frames 2 each consisting of a photographically recorded map part. For clarity the frames 2 over only a small length of the film 1 are shown.

The film 1 is stored on two freely rotatable spools 4 and 5 and passes between the spools through a film gate 6. The aperture of the system is represented at 3. The projecting light source and display screen are not shown.

As will be seen, the spools 4, 5 are not in line with each other and with the film gate 6 as in conventional practice, but are mounted behind the film gate 6 on an axis 7 which is parallel with the plane of the film 1 passing through the gate 6. Between the spools 4, 5 and the film gate 6 the film follows curved paths such that the film 1 turns through a right angle between each spool and the film gate 6. Guide elements in the form of rollers 8, 9, 10 and 11 are provided at the positions shown both to restrain the film and transmit drive thereto. The rollers 8, 9, 10 and 11 are in two pairs, one comprising the rollers 8 and 10 and the other comprising the rollers 9 and 11. The rollers of each pair are spaced from each other and present guide surfaces lying substantially in mutually intersecting planes. The axes of the rollers 8, 9, 10 and 11 are all fixed relative to the film gate 6 and all the rollers are arranged to be driven simultaneously and at the same speed by means not shown. The direction of rotation of the rollers is reversible.

The film gate 6 is controlled to move vertically in the directions of arrows 12 and 13 so that a selected portion of one of the frames 2 may be exposed to the aperture 3. Rollers 8, 9, 10 and 11 move with the film gate 6 so that the paths followed by the film between spools 4, 5 and rollers 10, 11 tilt and change slightly in length to allow continuous free movement of the film gate 6 and film 1 while the length of film between rollers 8 and 10 and between rollers 9 and 11 remains unchanged and continues to follow a natural curve. Thus no undue pressures have to be used to move the film 1 at high speed between the spools 4 and 5.

The whole assembly is rotatable about the axis 14, which is perpendicular to the axis 7 of the spools 4, 5, in order to rotate the display upon the display screen (not shown) as required to provide, for example, a so-called "north-up" or a so-called "head-up" display. Any suitable means may be provided for mounting the assembly for such rotation. Thus, as diagrammatically illustrated, the assembly comprising the spools 4 and 5, the film gate 6, and the rollers 8, 9, 10 and 11 is mounted by a frame F provided with shafts S along the axis 14, the shafts S being rotatable in fixed bearings B, B about the axis 14. As will be appreciated, the volume of space swept out by the rotating assembly described above is very much smaller than the corresponding volume of space which would be swept out by a conventional arrangement wherein the spools and film gate are in line.

I claim:

1. An airborne map display device comprising a film gate through which film, bearing map material, for display is passed; two film storage spools for the film; the film being arranged to pass through the gate from one spool to the other and the rotational axis of each spool being parallel with or making an angle substantially less than a right angle with the line of movement of film through the gate; means for guiding film between each spool and the film gate in such manner that the film therebetween includes a twisted portion between two relatively fixed points; and means mounting the whole assembly of said film gate, said spools and said film guiding means for rotation about an axis passing through the center of the display.

2. A device as claimed in claim 1 wherein the rotational axis of each spool is parallel to the direction of film movement through the film gate.

3. A device as claimed in claim 1 wherein the rotational axis of each spool makes an angle substantially less than 90° to the direction of film movement through the film gate.

4. A device as claimed in claim 1 wherein the spools are mounted on separate shafts having a common rotational axis.

5. A device as claimed in claim 1 wherein said means for guiding film comprises rollers provided at each of the two relatively fixed points in the path between each spool and the film gate, the rotational axes of all of the rollers being relatively fixed with respect to each other and to the film gate.

6. A device as claimed in claim 5 wherein the rotational axes of the two rollers in each path are at right angles to one another so as to restrain film therebetween to follow a path which is twisted in a natural curve through 180°.

7. A device as claimed in claim 5 wherein the rollers are arranged to be driven simultaneously and at the same speed so that the film between the rollers of each pair may take up a natural twist substantially free from tension.

8. A device as claimed in claim 1 wherein the film gate, together with the film guide means, is movable in a direction at right angles to the direction of film travel therethrough so as to enable different portions of the film to be displayed.

9. An airborne map display device comprising a film gate through which film, bearing map material, for display is passed; two film storage spools for the film; the film being arranged to pass through the gate from one spool to the other and the rotational axis of each spool being parallel with or making an angle substantially less than a right angle with the line of movement of the film through the gate; and means for guiding film between each spool and the film gate in such manner that the film therebetween includes a twisted portion between two relatively fixed points, said means for guiding film comprising, in each film path between a spool and the film gate, a pair of guide elements spaced from each other and presenting two film guiding surfaces lying substantially in mutually intersecting planes, the twisted film portion in each path being formed between the guide elements of each pair.

10. A device as claimed in claim 9 wherein at least one of said guide elements is a roller.

* * * * *